United States Patent [19]

Fage et al.

[11] Patent Number: 5,521,883
[45] Date of Patent: May 28, 1996

[54] METHOD OF REMOTELY DETERMINING THE THREE-DIMENSIONAL VELOCITY OF A FLUID SUCH AS AIR OR WATER

[75] Inventors: Jean-Michel Fage, Paris; Rémy Tasso, Chateaufort; Alain Donzier, Paris, all of France

[73] Assignee: Remtech, Velizy, France

[21] Appl. No.: 297,609

[22] Filed: Aug. 29, 1994

[30] Foreign Application Priority Data

Aug. 30, 1993 [FR] France .................................. 93 10348

[51] Int. Cl.$^6$ ........................................ G01S 15/88
[52] U.S. Cl. .......................... 367/90; 367/89; 73/861.25
[58] Field of Search ................................ 367/89, 90, 101; 73/170.13, 170.18, 861.25

[56] References Cited

U.S. PATENT DOCUMENTS

| | | | |
|---|---|---|---|
| 3,675,191 | 7/1972 | McAllister | 73/170.13 |
| 3,742,437 | 6/1973 | Thiele | 367/90 |
| 3,893,060 | 7/1975 | Balser | 367/113 |
| 4,143,547 | 3/1979 | Balser | 73/170.16 |
| 4,558,594 | 12/1985 | Balser et al. | 73/170.16 |
| 4,870,628 | 9/1989 | Zielinski | 367/88 |

FOREIGN PATENT DOCUMENTS

| | | |
|---|---|---|
| 0011912 | 8/1978 | European Pat. Off. . |
| 0163066 | 6/1984 | European Pat. Off. . |
| 0380441 | 1/1990 | European Pat. Off. . |
| 3806847 | 8/1990 | Germany . |

*Primary Examiner*—Ian J. Lobo
*Attorney, Agent, or Firm*—Lappin & Kusmer

[57] ABSTRACT

A method of remotely determining the three-dimensional velocity of a fluid such as air or water, the method consisting in emitting signals of determined frequencies in at least three different directions by means of a plane array of transducers, and in using said transducers to pick up acoustic signals backscattered by the fluid, the method consisting in emitting trains of signals at different determined frequencies f1, f2, and f3, firstly in a determined direction D1, then in a determined direction D2, and finally in a determined direction D3, and subsequently in picking up all of the signals backscattered by the fluid. The invention makes it possible to improve the accuracy and to increase the maximum range of measurements.

14 Claims, 2 Drawing Sheets

METHOD OF REMOTELY DETERMINING THE THREE-DIMENSIONAL VELOCITY OF A FLUID SUCH AS AIR OR WATER

The invention relates to a method of remotely determining the three-dimensional velocity of a fluid such as air or water, by means of an array of acoustic transducers used as emitters and as receivers.

BACKGROUND OF THE INVENTION

It is already known that a plane array of acoustic transducers organized in rows and in columns and oriented in a common direction perpendicular to the plane of the array can be used for emitting acoustic signals in various different directions and for receiving signals that are backscattered by the fluid. The principles on which the control and operation of an array of that type are based have already been described, in particular in U.S. Pat. No. 3,448,450 for a radar application, in French patent 2,499,252 in a sonar application, and in U.S. Pat. No. 4,558,594 in a "sodar" or acoustic "radar" application for determining wind velocity in the atmosphere.

In devices of that type, it is conventional to emit signals at known constant frequency in a determined direction, and then to pick up the signals that are backscattered in that direction, for the purpose of determining their frequency and of deducing the velocity of the fluid in the above-specified direction on the basis of the difference between the frequency of the emitted signals and the frequency of the signals as picked up (Doppler effect). Thus, by emitting and picking up acoustic signals successively in three different directions, it is possible to determine the three-dimensional velocities of wind in the atmosphere or of water in a current in the sea, for example.

OBJECTS AND SUMMARY OF THE INVENTION

A particular object of the invention is to greatly increase the performance of "sodars" or sonars of the type having an array of acoustic transducers, by means of a method that enables measurement accuracy to be improved, that enables the maximum range of sodars or of sonars to be increased, and that simultaneously reduces the total signal acquisition time.

To this end, the invention provides a method of remotely determining the three-dimensional velocity of a fluid such as air or water, the method consisting in emitting acoustic signals of determined frequency in at least three different directions by means of an array of transducers, in using the same transducers to pick up the acoustic signals backscattered by the fluid, and in determining the velocities of the fluid in the above-specified directions on the basis of the shifts in frequency between the emitted signals and the signals as picked up, the method consisting in emitting a train of signals having determined durations and determined different frequencies in one of the above-mentioned directions D1, then in another of said directions D2, and so on until said train of signals has been emitted successively in each of the above-mentioned directions, and then in picking up all of the backscattered signals, in simultaneously processing the picked-up signals to obtain frequency spectra following one another in time for each of the above-specified directions, and in deducing therefrom the velocities of the fluid at different distances in each of the above-specified directions.

For a given range, and relative to the case where signals are firstly emitted and received in one direction, and then in another direction, and so on, the total duration of backscattered signal reception, is thus reduced by a factor that is equal to the number of emission directions. This advantage becomes particularly significant once emission takes place in more than three directions, for example in five directions.

Furthermore, the use of a plurality of emission frequencies makes it possible to obtain given measurement accuracy with a smaller signal to noise ratio, e.g. a ratio that is 15 dB to 20 dB smaller when using five emission frequencies, which also has the consequence of increasing the maximum detection range.

In addition, by emitting signals firstly in one direction, and then in another direction, etc., it is possible to emit at full power in each direction.

In a first embodiment of the invention, the above-mentioned processing of the picked-up signals consists essentially in amplifying them, in digitizing them, in combining them mutually to obtain signals for each emission direction, and in applying fast Fourier transforms thereto.

Such processing is essentially digital and can be performed at very high speed on conventional data processing systems.

In another embodiment of the invention, the above-mentioned processing of the signals consists essentially in amplifying them, in digitizing them, in applying fast Fourier transforms thereto, and in mutually combining them to obtain signals that correspond to the emission directions.

In yet another implementation of the invention, the processing consists essentially in amplifying them, in combining them mutually to obtain analog signals corresponding to the transmission directions, then in digitizing the signals obtained in this way, and in applying fast Fourier transforms thereto.

The method of the invention also consists in verifying the compatibility of the velocities obtained at the various emission frequencies and in symmetrical emission directions in order to eliminate results that are erroneous or deviant, thereby contributing to obtaining given accuracy with a smaller signal to noise ratio.

To enable the method to be applicable to measurements performed at short distances, the invention also provides for permutating the order in which signals are emitted at different frequencies, and the order of emission directions.

In a particular embodiment, the invention provides for emitting trains of signals at five different frequencies successively in five different directions.

The redundancy of the data that results from emitting five frequencies in five directions contributes to improving the accuracy if measurement and to increasing the maximum detection range. In addition, the method whereby a plane array of acoustic transducers is controlled remains simple when emitting in five different directions that comprise the perpendicular to the plane of the array and four other directions that are symmetrical in pairs relative to said perpendicular.

The invention is equally applicable to detecting the speed of wind in the atmosphere (sodar system) and to detecting the speed of currents in the sea at different depths (sonar system).

BRIEF DESCRIPTION OF THE DRAWINGS

The invention will be better understood and other characteristics, details, and advantages thereof will appear more clearly on reading the following description given by way of example and made with reference to the accompanying drawings, in which.

MORE DETAILED DESCRIPTION

Figure 1:
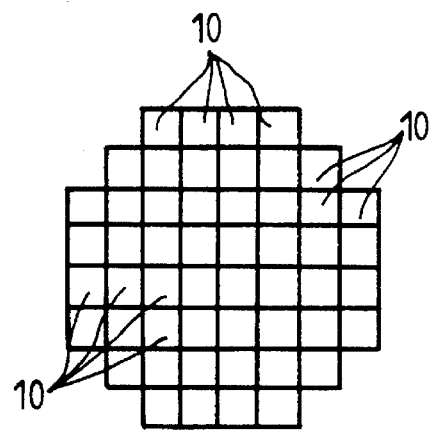
FIG. 1 is a diagram of a plane array of acoustic transducers for implementing the method of the invention.

By way of example, FIG. 1 is a diagrammatic representation of a plane array of acoustic transducers 10 which are organized in rows and in columns and which are all oriented in the same direction perpendicular to the plane of the drawing.

Such transducers arrays are now well known in the art, as are the principles applicable to controlling and operating them.

In summary, to emit successively in different directions, the lines of transducers 10 are fed with signals that are of determined frequency and that are phase shifted, e.g. by 90°, from one row of transducers to another, thereby defining a first emission direction. Thereafter, the same lines of transducers 10 are fed with signals that are at the same frequency, but that are phase shifted by 90° in the opposite direction from one row to another, thereby giving rise to emission in a direction that is symmetrical to the first about the perpendicular to the plane of the drawing, after which the columns of transducers 10 are fed with signals that are at the same frequency but that are shifted by 90° from one column, to the next, and so on, terminating with all of the transducers 10 being fed with signals that are at the same frequency and that are in phase so as to obtain emission in a direction perpendicular to the plane of the drawing.

It is thus possible to emit in five different directions, one of which directions is perpendicular to the plane of the drawing, while the other directions are symmetrical in pairs relative to the first direction and are contained in perpendicular planes that intersect on the first direction.

The above technique is well known to the person skilled in the art and is described in the prior documents mentioned above.

In similar manner, the backscattered signals which are picked up by the transducers 10 are processed in the same manner as the emission signals, but in inverse manner: the signals output by the transducers 10 are combined with one another after being phase shifted through 90° relative to one another from one row to the next or from one column to the next, with the combining or summing thereof making it possible to obtain simultaneously as many reception signals as there are emission directions.

Figure 3:
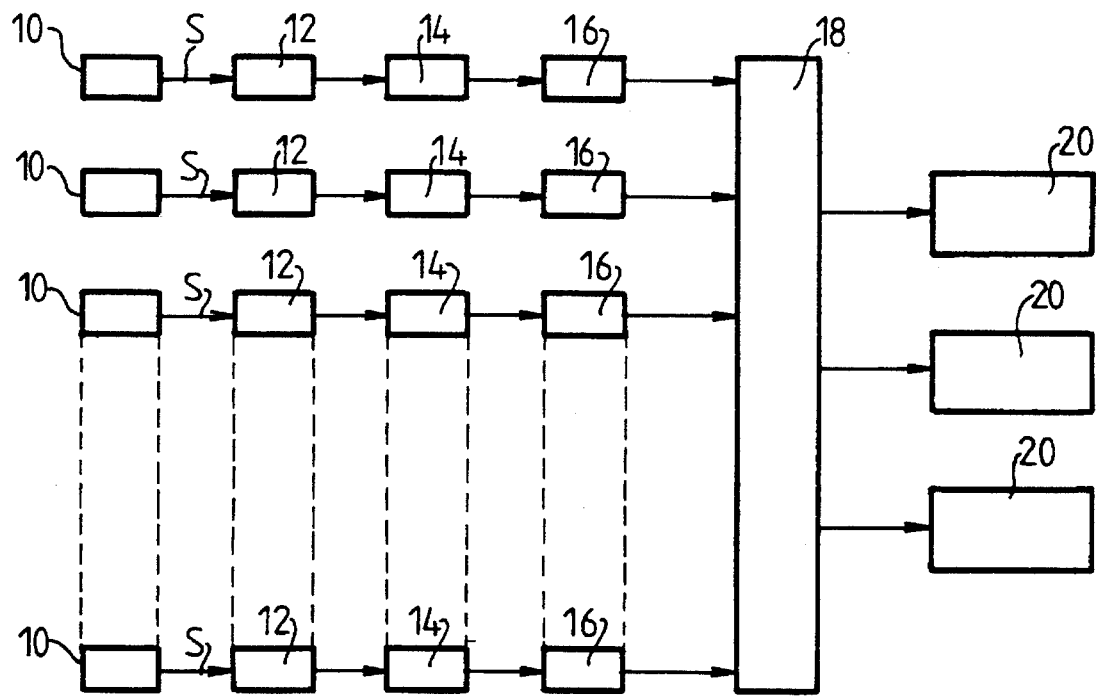
FIG. 3 is a block diagram of a system for processing backscattered signals as picked up by the acoustic transducers.
Figure 2:
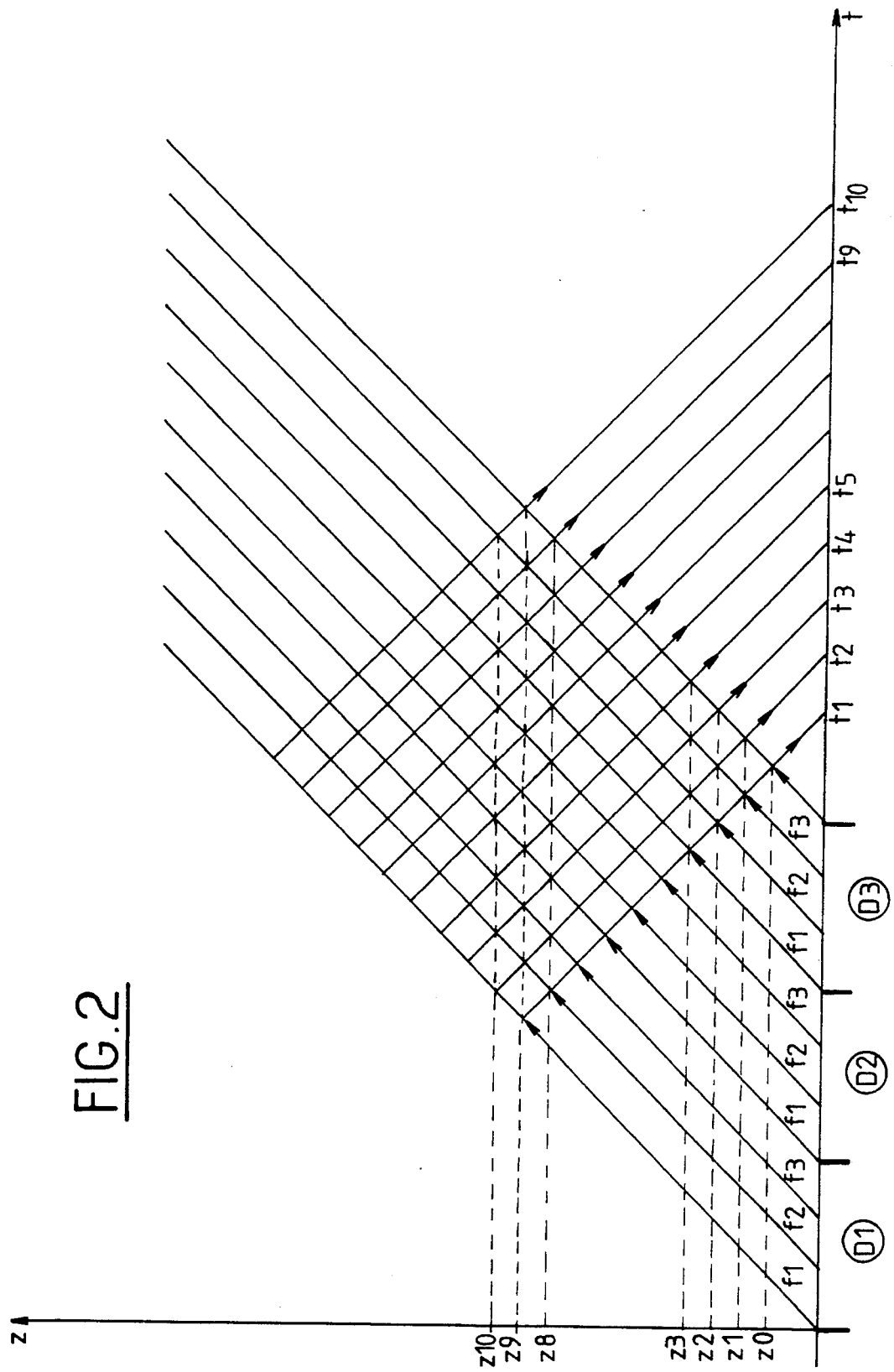
FIG. 2 is a graphical representation of how acoustic signals are emitted and received in the context of the method of the invention.

To enable the essential characteristics of the invention to be better understood, reference is now made to FIG. 2 which is a graphical representation diagrammatically representing the emission of acoustic signals at different frequencies in different directions, and the reception of signals that have been backscattered, e.g. by the atmosphere, where time $t$ is plotted along the abscissa and altitude $z$ is plotted up the ordinate. FIG. 3 corresponds to a simplified case in which signals are emitted at three different frequencies f1, f2, and f3 successively in three different directions D1, D2, and D3.

The method of the invention consists in emitting in direction D1 firstly a signal of frequency f1 for a predetermined duration, then a signal of frequency f2 for the same duration, and then a signal of frequency f3 for the same duration; thereafter in emitting in direction D2 the signal of frequency f1 for the above-mentioned duration, then the signal f2 for the same duration, and subsequently the signal of frequency f3 during the same duration; and finally in emitting in the direction D3 the signal of frequency f1 during the above-mentioned duration, then the signal of frequency f2 for the same duration, and finally the signal f3 for the same duration. The durations of the signals are not necessarily equal, and they may be arbitrary.

The signals travel through the atmosphere at a speed of about 300 meters per second (m/s) and they are backscattered in part by the atmosphere. The backscattered signals are picked up by the transducers 10 with said signals being received after the signals at all of the determined frequencies and in all of the determined directions has been emitted, with signal reception beginning after a certain amount of time has elapsed from the end of signal emission, said relatively short time lapse corresponding to the time required for switching the circuits and defining a minimum measurement altitude z0. If reception begins at time t1, it can be seen that during an interval t1–t2, signals are received that were emitted at the frequency f3 and in the direction D3, and that have been backscattered by a slice of altitude z0–z2, together with signals that were emitted at the frequency f2 in the direction D3 and that have been backscattered by the slice of altitude z1–z3, and the signals that were emitted at the frequency f1 in the direction D3 and that have been backscattered by the slice of altitude z2–z4, and so on, terminating with the signals that were emitted at the frequency f1 in the direction D1 and that have been backscattered by the slice at altitude z8–z10.

It can also be seen that for the slice of altitude z0–z2, and during time interval t1–t2, the only signal which is received was emitted at the frequency f3 in the direction D3 and has been backscattered by the slice at altitude z0–z2, and that for said slice, no signals emitted at the frequencies f1 or f2 in the direction D3 are received, nor are any signals emitted in the directions D1 and D2.

For the slice at altitude z1–z3, centered on z2, and during time interval t1–t2, the signal emitted at frequency f2 in direction D3 is received, while during time intervals t2–t3, the signal emitted at frequency f3 in direction D3 is received.

For the slice of altitude z8–z10 centered on z9, it is possible during time interval t1–t10 to pick up all of the signals of frequencies f1, f2, and f3 as emitted in all of the directions D1, D2, and D3, and which are backscattered by said slice. Thus, going from this altitude slice, and up through each slice of greater altitude, three different frequencies emitted in three different directions are thus available, thereby giving rise to nine items of information concerning the wind velocity at a given altitude.

When trains of signals are emitted at five different frequencies in five different directions, then, starting from the slice of altitude z24–z26 (centered on z25, not shown), it is possible to pick up 25 items of information relating to wind velocity at a given altitude.

The invention also makes it possible to permutate (at intervals that may be regular or otherwise) the order in which the frequencies are emitted, and the order in which different directions are emitted. This makes it possible to obtain greater amounts of information at low altitudes, and, for example, to obtain backscattered signals coming from signals emitted at frequencies f1, f2, and f3 in directions D1, D2, and D3 for altitudes lower than the slice z8–z10 in the example shown in FIG. 2.

To avoid possible ambiguity, e.g. due to a frequency shift due to the Doppler effect and being of the same order of magnitude as the separation between two emission frequencies, the approximate size of the Doppler effect frequency shift can be determined before or after a series of measurements by intermittently emitting signals at a single frequency in each of the predetermined measurement directions. The results then obtained serve to fix the order of magnitude of the Doppler effect due to wind speed, thereby providing information about possible danger of ambiguity and making it possible to take the appropriate measurements. It is also possible, for this purpose, to emit signals at different frequencies that are separated by differences that are relatively large, and greater than any Doppler effect differences.

Reference is now made to FIG. 3 while describing one method of processing the signals output by the transducers 10, which signals are representative of acoustic signals backscattered by the atmosphere at different altitudes and in different directions.

In the array of transducers 10 shown in FIG. 1, which array comprises 52 transducers, the transducers are grouped together in conventional manner in 16 subassemblies for facilitating control of the array of transducers. It is these subassemblies of transducers 10 that pick up the signals backscattered by the atmosphere and that produce output signals which are applied to the processing system of FIG. 3.

This processing system comprises 16 parallel paths, each of which receives the output signal S from a respective subassembly of transducers 10, which signal is firstly applied to an amplifier 12 whose output is connected to analog to digital converter means 14, e.g. sampling means.

Thereafter, the digital signals are processed at 16 to apply fast Fourier transforms so as to gain access to the frequencies of said signals.

The results of the transforms are then processed at 18 by software for combining signals which, as mentioned above, combines the signals by phase shifting and summing in a manner similar to that performed for emitting signals at different frequencies and in different directions, so as to obtain output frequency spectra 20 each of which corresponds to an emission direction.

In a variant, the signals amplified at 12 may be mutually combined to provide signals that correspond to the various emission directions before or after they are digitized at 14 and before they are processed by fast Fourier transforms.

When three different frequencies are emitted in succession in each emission direction, each frequency spectrum 20 comprises three frequencies each of which corresponds to a slice at a different altitude.

The frequency signals which are thus obtained in succession over a period of time are subsequently recombined by altitude slice and by emission direction. By comparing these frequencies with the emission frequencies, frequency offsets are obtained which are due to the Doppler effects of the air speed in given directions and for determined altitude slices.

As a result, the three-dimensional components of air speed at different altitude slices are thus obtained.

In any event, at the end of processing, checks are performed to determine whether the velocities obtained at different frequencies are mutually compatible. Such comparison relates to the velocities obtained at the various emission frequencies for a common emission direction, and also to the horizontal components of the velocities obtained for emission directions that are symmetrical about the vertical.

Specifically, there follow below concrete examples of the essential characteristics of three devices in which the method of the invention has been implemented.

The first device is a sodar for measuring the velocity of the atmosphere between a minimum altitude of about 20 meters (m) and a maximum altitude lying in the range about 1 km to about 2 km. Using that device, five signals of different frequencies have been emitted successively in five different directions, with the duration of emission of each signal being about 200 ms, with the acoustic power emitted lying typically in the range 2 W to 80 W, and with the emission frequencies being centered on 2100 Hz and differing from one another by 75 Hz. The total time required for emission in all five directions is thus about 5 seconds, and the total time required for reception is of the order of 10 seconds. The time required for processing the output signals from the transducers is of the order of about 10 seconds and varies with the range of the device. In practice, emission-reception cycles are repeated over a few minutes in order to provide mean values for the measurements.

The second device was likewise a sodar for measuring air velocity but between a minimum altitude of about 60 m and a maximum altitude lying in the range about 3 km to about 5 km. That device emitted five signals at different frequencies successively in five different directions, with each signal being emitted for a duration of about 600 ms, its power lying in the range about 200 W to about 300 W, and the frequencies of the emission signals being centered on 700 Hz and being mutually spaced apart by about 25 Hz. The total duration of emission in all five different directions is therefore about 15 seconds, so the total reception duration is about 30 seconds.

The third device was a sonar for measuring the velocity of water at depths lying in the range about 20 m to about 1 km to 2 km. That device emitted five signals at different frequencies successively in five different directions, with each signal being emitted for a duration of about 40 ms, its power lay in the range a few Watts to several hundreds of Watts, its emission frequencies were centered on 40 kHz and were mutually separated by about 500 Hz.

We claim:

1. A method of remotely determining the three-dimensional velocity of a fluid such as air or water, the method consisting in emitting a train of acoustic signals of determined frequency in at least three different directions by means of an array of transducers, the emitted signals having determined durations and determined different frequencies and being emitted in succession in one of the said directions, then in another of said directions, and so on until said train of signals has been emitted successively in all said directions, in using the same transducers to pick up the acoustic signals backscattered by the fluid, the signals picked-up during each of a succession of time intervals equal to the said duration of an emitted signal comprising signals having different frequencies which have been backscattered by the fluid in the said different directions and at different distances from the transducers, in processing the signals picked-up during said succession of time intervals to obtain frequency spectra following one another in time for each of the said directions, and in deducing therefrom the velocities of the fluid at different distances in each of the said directions on the basis of the shifts in frequency between the emitted signals and the picked-up signals.

2. A method according to claim 1, wherein the processing of the picked-up signals consists essentially in amplifying them, in digitizing them, in combining them mutually to obtain signals corresponding to the emission directions, and in applying fast Fourier transforms thereto.

3. A method according to claim 1, wherein the processing of the picked-up signals consists essentially in amplifying them, in digitizing them, in applying fast Fourier transforms thereto, and in mutually combining them to obtain signals corresponding to the emission directions.

4. A method according to claim 1, wherein the processing of the picked-up signals consists essentially in amplifying them, in mutually combining them to obtain analog signals corresponding to the emission directions, then in digitizing the signals obtained in this way and in applying fast Fourier transforms thereto.

5. A method according to claim 1, consisting, for measuring velocities at short distances, in permutating the emission order of the signals at different frequencies and the order of the emission directions.

6. A method according to claim 1, consisting in verifying the compatibility of the velocities obtained at different emission frequencies for a given emission direction, and for emission directions that are symmetrical about the vertical.

7. A method according to claim 1, wherein the number of different frequencies emitted is not less than 3.

8. A method according to claim 1, characterized it that the method consists in successively emitting trains of signals at five different frequencies and in five different directions.

9. A method according to claim 1, consisting in intermittently emitting signals at a single frequency to determine the order of magnitude of the frequency offset between emitted signals and picked-up signals, or signals of different frequencies separated by relatively large differences, greater than the frequency offsets to be measured.

10. A method according to claim 1, wherein the fluid is atmospheric air, and the emitted signals have durations of the order of 200 ms, and the emission frequencies are separated by about 75 Hz, the range of emission frequencies being centered on a value of about 2.1 kHz.

11. A method according to claim 1, wherein the fluid is atmospheric air, and the emitted signals have durations of the order of 600 ms, and the emission frequencies are separated by about 25 Hz, the range of emission frequencies being centered on a value of about 700 Hz.

12. A method according to claim 1, wherein the fluid is water, and the emitted signals have durations of the order of 40 ms, and frequencies that are separated by 500 Hz, the emission frequency range being centered on a value of about 40 kHz.

13. A method for remotely determining the velocity of a fluid at a plurality of points in said fluid, comprising:

A. providing an array of acoustic transducers,

B. controlling said transducers to operate as a phased array, and in a first mode;
  i. to generate a succession of acoustic signals during a corresponding succession of time intervals, wherein successive groups of said acoustic signals in said succession propagate from said array in a different one of a set of predetermined directions and wherein each of said groups includes a plurality of said signals, each signal of said plurality having a predetermined duration and being at a different one of a set of predetermined frequencies, and in a second mode:
  ii. to simultaneously receive for each of said directions, and in each of a succession of a time intervals, portions of each of said plurality of signals which are backscattered from said fluid, C. determining from said received signals during said succession of time intervals the velocity of said fluid at a plurality of different distances from said array.

14. A system for remotely determining the velocity of a fluid at a plurality of points in said fluid, comprising:

A. an array of acoustic transducers,

B. means for controlling said transducers to operate as a phase array, and in a first mode:
  i. to generate a succession of acoustic signals during a corresponding succession of time intervals, wherein successive groups of said acoustic signals in said succession propagate from said array in a different one of a set of predetermined directions and wherein each of said groups includes a plurality of said signals, each signal of said plurality having a predetermined duration and being at a different one of a set of predetermined frequencies, and in a second mode;
  ii. to simultaneously receive for each of said durations, and in each of a succession of a time intervals, portions of each of said plurality of signals which are backscattered from said fluid, C. means for determining from said received signals during said succession of time intervals the velocity of said fluid at a plurality of different distances from said array.

* * * * *